United States Patent [19]
Gang

[11] Patent Number: 5,894,846
[45] Date of Patent: Apr. 20, 1999

[54] APPARATUS AND METHOD FOR LENGTHENING AND THICKENING HAIR AND FOR FASTENING HAIR PIECES

[76] Inventor: Heide-Rose Gang, Motostrasse 30, D-80806 Munich, Germany

[21] Appl. No.: 08/836,726

[22] PCT Filed: Nov. 8, 1995

[86] PCT No.: PCT/EP95/04396

§ 371 Date: Aug. 22, 1997

§ 102(e) Date: Aug. 22, 1997

[87] PCT Pub. No.: WO96/14767

PCT Pub. Date: May 23, 1996

[30] Foreign Application Priority Data

Nov. 9, 1994 [DE] Germany ................. 44 40 017
Jun. 8, 1995 [DE] Germany ................. 195 20 972

[51] Int. Cl.$^6$ ............................................. A41G 3/00
[52] U.S. Cl. ................. 132/201; 219/225; 219/535; 219/227; 132/53
[58] Field of Search .................... 132/201, 53, 54, 132/56, 271, 224, 225; 219/225, 535, 222, 227, 228, 229

[56] References Cited

U.S. PATENT DOCUMENTS

| 1,455,696 | 5/1923 | Wright | 132/224 |
|---|---|---|---|
| 1,667,556 | 4/1928 | Lewis | 132/224 |
| 2,400,696 | 5/1946 | Jones | 219/230 |
| 2,449,521 | 9/1948 | Warner | 219/227 |
| 3,412,233 | 11/1968 | Wilkie | 219/225 |
| 3,642,010 | 2/1972 | Kuris | 132/201 |
| 3,865,662 | 2/1975 | Segal | 219/228 |
| 3,980,861 | 9/1976 | Fukunaga | 219/230 |
| 4,662,068 | 5/1987 | Polonsky | 30/124 |
| 4,982,748 | 1/1991 | Trimarchi . | |
| 5,072,745 | 12/1991 | Cheh | 132/201 |
| 5,107,867 | 4/1992 | Barrington . | |

FOREIGN PATENT DOCUMENTS

| 0133291 | 2/1985 | European Pat. Off. . | |
|---|---|---|---|
| 224970 | 6/1987 | European Pat. Off. | 219/222 |
| 5156506 | 6/1993 | Japan . | |
| 1085972 | 10/1967 | United Kingdom | 219/228 |
| 2147233 | 5/1985 | United Kingdom | 219/228 |
| 2271057 | 4/1994 | United Kingdom . | |

OTHER PUBLICATIONS

International Search Report for PCT/EP95/04396, published with WIPO 96/14767, May 23, 1996.

*Primary Examiner*—Todd E. Manahan
*Assistant Examiner*—Eduardo C. Robert
*Attorney, Agent, or Firm*—Fitch, Even, Tabin & Flannery

[57] ABSTRACT

The invention concerns a device for lengthening a person's own hair using artificial and/or genuine hair and for the permanent fastening of artificial and/or genuine hair. The invention is characterized in that a tube (12), which can be shrunk when energy is applied, is disposed above a thickened portion, secured in position, in particular a knot in a strand of a person's own hair (16) and above an extension piece of artificial and/or genuine hair. An energy-application device, in particular in the form of heating irons (20), transfers thermal energy in a deliberate manner to the shrinkable tube (12). The method in which the device is used is characterized by the following steps: knotting a strand of the person's own hair, sliding onto the knot in the hair strand a fastening element which can shrink when energy is applied; sliding an extension strand of artificial and/or genuine hair into the tube; and shrinking the shrinkable fastening element by the application of energy.

3 Claims, 4 Drawing Sheets

APPARATUS AND METHOD FOR LENGTHENING AND THICKENING HAIR AND FOR FASTENING HAIR PIECES

The invention relates to an apparatus for lengthening a person's own hair using artificial and/or genuine hair and for permanently fastening artificial and/or genuine hair; the invention also relates to the method applied in this regard when using the above apparatus.

BACKGROUND OF THE INVENTION

Biosynthetic achievements including the extension of and permanent attachment to tufts of a person's own hair, i.e. hair that is growing naturally out of the scalp, using genuine and/or artificial hair. Such techniques are used on the one hand for medical applications, though primarily for cosmetic applications. A person's own hair can be lengthened, not to mention thickened, in that a person's own hair and the genuine and/or artificial hair fastened thereto is cut to the same length. In technical fields, a great many systems are known for lengthening and thickening a person's own hair; such systems are described in the 21/94 edition of the "Top Hair Special" magazine. In accordance therewith, a person's own hair can be extended by using artificial or genuine hair by means of special binding and knotting techniques and by various adhesive techniques.

U.S. Pat. No. 5,107,867 describes a hair extension method in which strands of the hair to be extended are joined using a heat-resistant adhesive in order to form a graft on a strand of extension hair, whereupon a coating consisting of a plastic material that is fusible when heat is introduced is applied to this graft. Strands of the person's own natural hair are then threaded through a shrinkable tube portion, the graft of extension hair pretreated in the above-described manner is also inserted into the shrinkable tube and this shrinkable tube treated by application of heat. Either a heating iron, which is described in further detail, or another suitable device can be used. On the one hand, the application of heat causes the tube to shrink, on the other hand the fusible adhesive melts and produces a permanent connection between the natural genuine hair and the strand of extension hair. The tube is intended to protect the connection from environmental influences, but it is also intended to act as a hair care product. If heat is re-applied to the shrinkable tube, the hair extension can be removed once again.

This and other techniques in which adhesives are used make it necessary for a person to after-treat his/her own hair once the hair extension has been removed. Residual adhesive sticking in a person's own hair has to be removed by using a suitable solvent, usually acetone. This results in damage to a person's own hair, particularly as the hair extension methods need to be repeated at regular intervals, approximately every 6 weeks. When solvents are used for such a frequent treatment of the natural hair of the head, a person's own hair may be destroyed at the connecting points.

SUMMARY OF THE INVENTION

The present invention aims to develop an apparatus of the aforementioned type for lengthening a person's own hair and for permanently fastening artificial and/or genuine hair; such an apparatus allows a person's own hair to be lengthened or an extension strand or a hair-piece to be permanently fastened in a simple and inexpensive manner without damaging a person's own hair in the process.

The invention's object is solved in that in the aforementioned type of apparatus, a tube which can be shrunk when energy is applied is disposed around a positionally secured, thickened portion, particularly a knot in a strand of a person's own hair, and around a strand of artificial or genuine hair; and energy means transfers energy, particularly heat, to the shrinkable tube.

The advantage of this invention lies in the fact that without applying adhesive, the mechanical connection between a person's own hair and an extension strand of artificial or genuine hair occurs by means of shrinking the tube on an area where there is a positionally secured, thickened portion, such as a knot in a person's own hair.

This knot makes an important contribution toward the connection's stability because it is located roughly in the center of the shrinkable tube—when heat acts thereon—is constricted on both sides of the knot over a smaller cross section than is possible in the area of the knot. This achieves an additional holding function which is brought about in the prior art by the application of adhesives.

The method to be applied so as to lengthen a person's own hair is characterized by the following steps:

Knotting a strand of a person's own hair, sliding a fastening element, particularly a tube, which can be shrunk when energy is applied, onto the knot of a person's own strands of hair; sliding a strand of artificial and/or genuine hair into the tube; and shrinking the shrinkable fastening element by applying energy.

The method according to the invention enjoys the advantage that the connection produced therein between a person's own hair and the artificial or genuine hair is detachable without residue, thus preventing a person's own hair from being damaged even when this technique is frequently applied. The application is without pain and the tractive forces that arise are kept to a minimum, thereby avoiding instances of disturbed blood supply in the area of the scalp. Because of the connecting elements' low weight and high flexibility, the extension strands are not felt to be inconvenient by the wearer.

According to a preferred embodiment, that end of the strand of artificial or genuine hair which is disposed within the shrinkable tube is embedded in a heat-resistant adhesive. In consequence, the extension hair strand is lent a good hold, thus facilitating the insertion of this strand of extension hair into the shrinkable tube as part of the method according to the invention. The strands of artificial or genuine hair being used in the apparatus and method according to the invention can furthermore be used several times, so that the removal and storage of the strand of extension hair is considerably improved as a result of bonding the end.

According to a further embodiment, the energy application means is constituted by a heating iron which has two profiled jaws directed toward one another, at least one profiled jaw of which is heatable.

The use of a heating iron has the advantage that the thermal energy to be expended so as to shrink the tube can be transferred very conveniently to the shrinkable tube. Heat transfer also takes place in a highly systematic manner, i.e. the thermal energy to be expended to shrink the tube is transferred by bringing the heating iron into direct contact with the shrinkable tube. As a result, the total amount of energy expended can be reduced, though the generation of heat in the area surrounding the shrinkable tube is also kept very low. This is extremely important because the connecting sites between a person's own hair and the extension strand of artificial or genuine hair are usually located very close to the scalp and a development of pain can therefore be avoided.

According to another embodiment, the heating iron has either a stationary or a pivotable shank or two pivotable shanks to which the profiled jaws are respectively attached. The heating iron can then be moved from an opened position into a closed position in which the profiled jaws are slightly spaced apart from one another or are in contact with one another.

By providing one or two pivotable shanks it is possible to open the heating iron, to dispose between the profiled jaws the shrinkable tube to be treated and containing the knotted strand of a person's own hair and the extension strand or to insert the tube into one of the profiled jaws and then to move the heating iron into a closed position in which the two profiled jaws come into contact with the shrinkable tube.

In this regard, it is advantageous for one or both profiled jaws to have a groove into which the shrinkable tube can be inserted. Furthermore, so as to cause the shrinkable tube to be constricted on both sides of the knot located in the shrinkable tube, it is advantageous for one or both profiled jaws to have an indentation into which the positionally secured thickened portion, for example the knot, can be inserted.

According to a preferred embodiment, the two profiled jaws are heatable. This causes heat to be evenly applied to the shrinkable tube, making it possible to reduce the treatment duration for producing a connecting element both heatable profiled jaws are preferably heatable to a temperature ranging between 100° C. and 350° C. Both profiled jaws can be heatable to the same temperature; but it is preferable for one profiled jaw to be heatable to a lower temperature than the other profiled jaw. This has the advantage that it is possible to work in direct proximity to the scalp in that the heating irons are held such that the profiled jaw facing toward the scalp has a lower temperature than the profiled jaw facing away from the scalp. This likewise makes it possible to work in direct proximity to the scalp without causing any pain on account of the high generation of heat or without damaging the hair in close proximity.

According to a preferred embodiment, one or both profiled jaws is/are fitted with a temperature sensor.

This has the advantage that the temperature of the one or of both profiled jaws can be monitored, thus enabling the occurrence of interference to be identified in good time, whereby on the one hand, the risk of a nondurable connection between the person's own hair and the extension strand can be avoided when the temperature is too low, while on the other hand, the risk of damaging the hair can be avoided when the temperature is too high.

The temperature of one or both profiled jaws is/are preferably controllable. Depending on the particular application and the use of different materials for the shrinkable tube, this makes it possible to set those temperatures best suited for this purpose and to check that such temperatures are adhered to.

In a preferred embodiment, one or both profiled jaws is/are provided with a heat insulation element. As already mentioned, application frequently takes place in direct proximity to the scalp, with the result that the provision of a heat insulation element avoids a possible development of pain, particularly if that profiled jaw of the heating irons which faces toward the scalp accidentally comes into contact with the scalp. The heat insulation element is preferably made from a material, particularly plastic, that sheathes that profiled jaw and has poor thermal conductivity.

When actuated, the heating iron can, according to another embodiment, remain in the closed position for an adjustable interval of time. In consequence, the contact time between the shrinkable tube and the profiled jaws that is best suited to the application of heat to the shrinkable tube can be set and the heating iron automatically remain in the closed position for this preselected interval of time. This makes it possible to rule out operating errors which may result in an inadequate mechanical connection between the extension strand and the person's own hair, but which may also cause pain to take effect an undesirable extent.

The present invention will be described as follows purely by way of example on the basis of the attached drawings.

DETAILED DESCRIPTION OF THE PREFERRED EMBODIMENT

Figure 1:
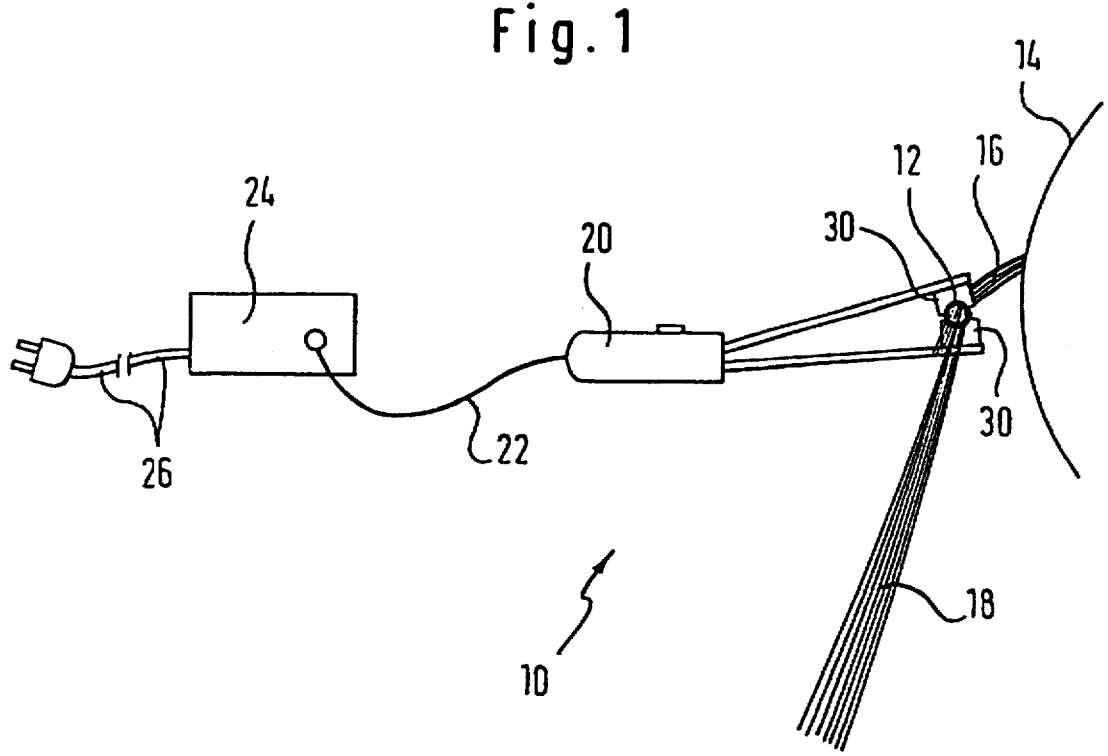
FIG. 1 shows a schematic view of the hair extension apparatus according to the invention.

FIG. 1 shows a schematic view of the apparatus for lengthening and permanently fastening a person's own hair using artificial and/or genuine hair, this apparatus being designated in general by the reference number 10. The apparatus comprises a shrinkable tube 12 which in proximity to the head 14, is fitted onto a strand 16 of the person's hair and onto an extension strand 18 of artificial and/or genuine hair. As will be subsequently depicted by FIG. 2, a knot is present in the strand 16 of the person's own hair. Energy application means, in this particular instance in the form of heating iron 20, transfers thermal energy to the shrinkable tube 12.

Various other technical versions of an energy application device are feasible instead of the heating irons 20. Apart from generating thermal energy by a suitable heat carrier medium or by using a resistor wire, the application of energy may for instance take place by means of laser treatment or by ultrasonic emission.

The heating iron 20 is preferably heated via a resistor wire and connected by a connecting cable 22 to a controlled 24 which is in turn battery-powered, or may be connected via a mains lead 26 to the mains power supply.

In the simplest of cases, the controller can supply energy to one or both of the profiled jaws 30 of the heating iron 20, but is also able to assume responsibility for more extensive display or control duties. For example, the controller 24 can process the temperature registered via temperature sensors on the profiled jaws as part of a control loop and hence ensure that the temperature of one or both profiled jaws is kept constant, but the controller can also display merely the temperature or temperatures or—if the heating iron 20 are automatically closed—it can drive the movement of one or both shanks of the heating iron 20 such that these shanks remain in the closed position for a present interval of time.

Figure 2:
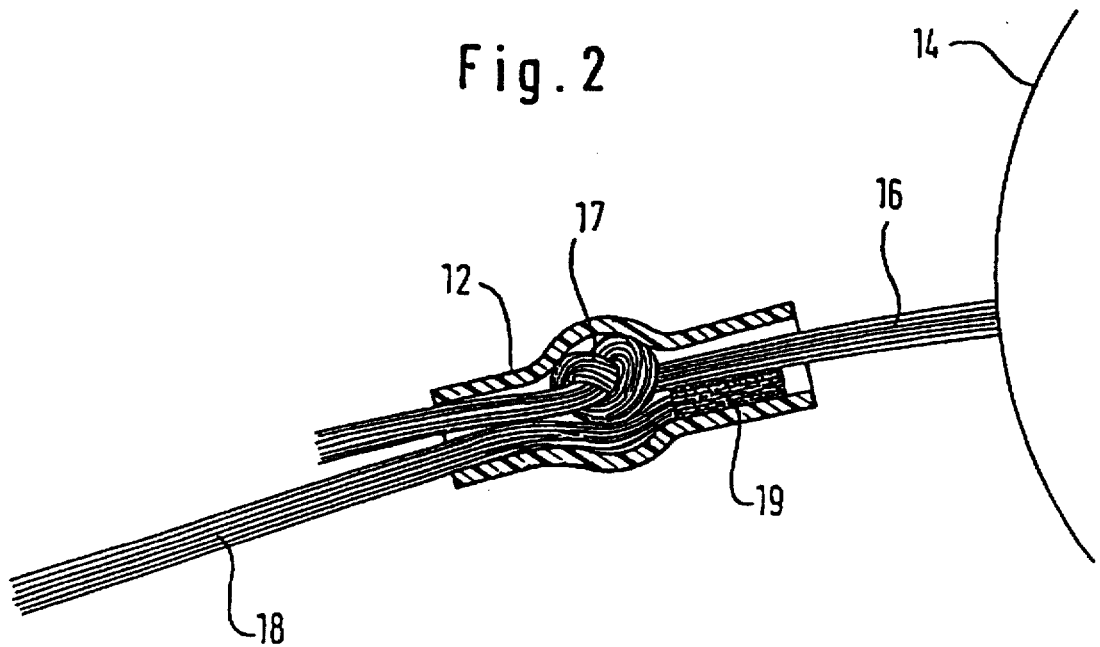
FIG. 2 shows a schematic section of the hair connection in the region of the shrinkable tube.

FIG. 2 shows a schematic view of how a strand 16 of a person's own hair and an extension strand 18 are connected to a shrinkable tube 12. For the purpose of simpler explanation, just a single strand 16 of a person's own hair is shown on the head 14. The stand of a person's own hair consists of about ten to fifty hairs, depending on the client's hair thickness and bearing the client's specific wishes in mind. Having been adapted to the thickness of these hair strands, shrinkable tubes are available in various gradations of diameter. The strand 16 of a person's own hair is preferably knotted close to the head 14, with various techniques being known for this purpose. An entwinement is preferably produced in the hair by using a crochet needle.

In FIG. 2, the strand 16 of a person's own hair ends just after the pint where it emerges from the shrinkable tube 12. The method according to the invention for lengthening a person's own hair may, however, also be used when it is intended to bridge a transitional period between hair that has been cut short and hair that has been deliberately left to grow long. In this instance, the strand of a person's own hair and the extension strand are also preferably connected together in direct proximity to the head 14; the strand 16 of a person's own hair may nevertheless be grown long, for example shoulder length.

When, after the strand 16 of a person's own hair has been knotted, the method according to the invention is performed, the shrinkable tube 12 is slid over the strand 16 of a person's own hair so that the knot 17 in relation to the axial length of the shrinkable tube is approximately in the middle of same. The extension strand 18 is then likewise slid into the shrinkable tube, whereby attention must be paid to the fact that after insertion, the extension strand 18 extends across the entire length of the shrinkable tube 12 or a large proportion of the length of the shrinkable tube 12. For the purpose of anchorage behind the knot 17, the extension strand 18 has an adhesive site 19 composed of a thermally non-fusible adhesive and which ends up situated within the shrinkable tube 12. The adhesive site 19 advantageously makes it easier to insert the extension strand 18.

The adhesive site 19 is applied to the extension strand 18 in an upstream procedural step and is used to render this strand more easily manageable. The extension strand can be re-used several times, with the result that a secure hold of the strand is extremely advantageous for insertion into the shrinkage tube, for removal from the shrinkage tube and for any interim storage of the extension strand.

The hair combined in the extension strand is preferably turned helically within the region of the adhesive site 19, thereby forming a very good connection to the closely fitting shrinkable tube 12 and the strand 16 of a person's own hair in the region of the knots 17.

The shrinkage tube is manufactured from plastic and is about 15 mm in length. As depicted in FIG. 2, the shrinkable tube 12 is shrunk onto the connection of the two strands of hair under the action of heat, thus forming a bulge in the region of the knot 17.

Figure 3:
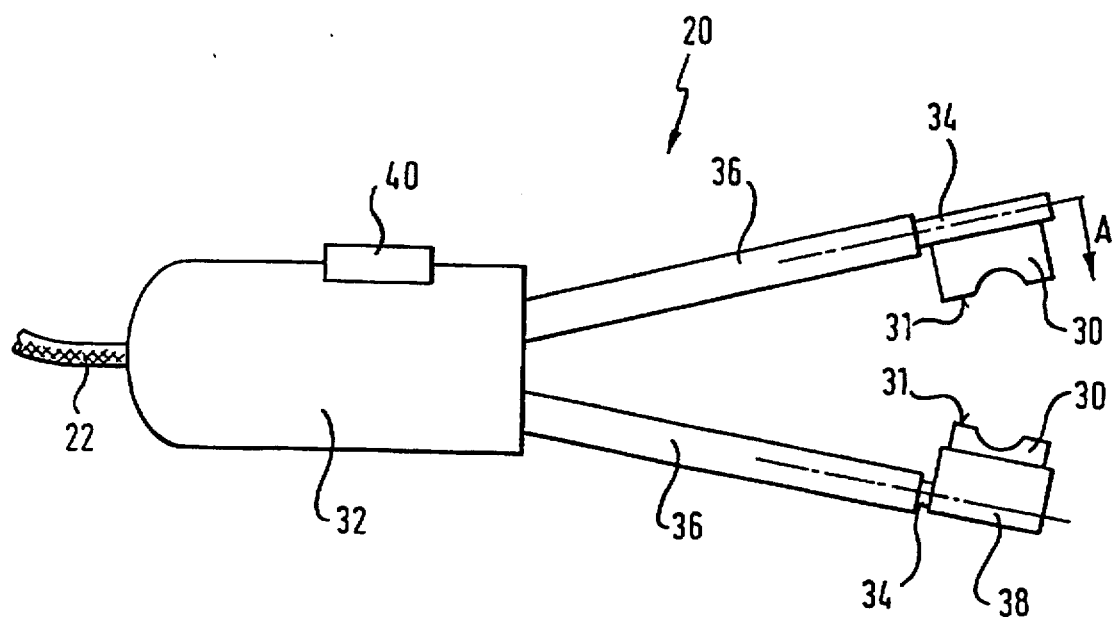
FIG. 3 shows an embodiment of an energy application device in the form of heating irons.

FIG. 3 shows an embodiment of the heating iron 20 according to the present invention.

The heating iron 20 essentially comprises a handle 32, shanks 34, profiled jaws 30 and the connecting cable 22. The handle 32 consists of an insulating enclosure, preferably made of plastic, within which are located the power supply via the connecting cable 22, the attachment of the shanks 34 in the form of a stationary and a pivotable shank or in the form of two pivotable shanks, the transfer of the measurement signal or signals of one or more temperature sensors and, in a feasible embodiment, a mechanism for automatically closing the heating irons by moving the shanks 34 toward one another.

The heat generating means, which is for example designed to resemble that of a soldering iron, may be located within the shanks 34. The shanks 34 are preferably surrounded by an insulating enclosure 36.

The profiled jaws 30 are attached to the ends, remote from the handle 32, of the shanks 34. The profiled jaws consist of a material that conducts heat well, preferably a metal that conducts heat well. It is particularly preferable to design the profiled jaws in aluminum or bronze because on the one hand, these metals have good thermal conductivity, and on the other, they can be easily machined.

The profiled jaws 30 can be attached to the shanks 34 in any manner, and when the heating iron 20 is actuated, these jaws are moved toward one another with the heating surfaces 31, as shown in FIG. 3 by means of arrow A. The arrangement of the profiled jaws 30 represented in FIG. 3 in relation to one another at a greater distance is to be designated as an opened position of the heating iron 20, whereas pivoting the shank 34 in the direction of arrow A is designated as the heating iron's closed position, as is the associated act of bringing the heating surfaces 31 of the profiled jaws 30 into contact or of virtually bringing them into contact.

The heating surfaces 31 of the profiled jaws 30 may have a random shape, but are preferably profiled such that a shrinkable tube 12 that is disposed perpendicular to the plane of projection in FIG. 3 between the heating surfaces 31 can be inserted into corresponding grooves of the heating surfaces 31. This entails the advantage that the shrinkable tube can be fitted or inserted onto one of the two heating surfaces 31 and is secured in position to a certain degree before the other heating surface pivots in the direction of the shrinkable tube when the heating iron is moved into the closed position.

One or both of the profiled jaws can be connected to a heat insulation element 38 that completely or partially surrounds the profiled jaw beyond the heating surface. The heat insulation element is preferably formed from a material that has poor thermal conductivity, as exhibited by a great many plastics, such as Teflon.

With the help of the actuating switch 40 which moves the heating iron from the opened to the closed position, the heating iron 20 can be operated via various active mechanisms known in technical fields.

One of the profiled jaws, or both profiled jaws, can be heated electrically. Both the profiled jaws are preferably heatable, with either the tow profiled jaws being heatable to the same, rigidly predetermined temperature, or with the two profiled jaws being heatable to a rigidly predetermined but different temperature, or with both profiled jaws being heatable to a temperature that can be jointly set for both jaws or separately for each individual jaw. The two profiled jaws are preferably heatable to a temperature varying between 100° C. and 350° C. The provision of different temperatures was found to be particularly advantageous, with one profiled jaw being heatable to 120° C. and the other to 220° C.

To check the temperatures of the profiled jaws, as well as to regulate them, one or more temperature sensors may be located on one or both profiled jaws. All the temperature sensors known in the field of technology, such as resistance temperature sensors or bimetallic thermocouples, can be used here. In particular, it is important to adhere accurately to the temperature, it being particularly important to avoid exceeding the temperature, at the profiled jaw facing toward the head. For this reason, a heat insulation element is also preferably disposed on this so-called head-end profiled jaw.

Figure 4:
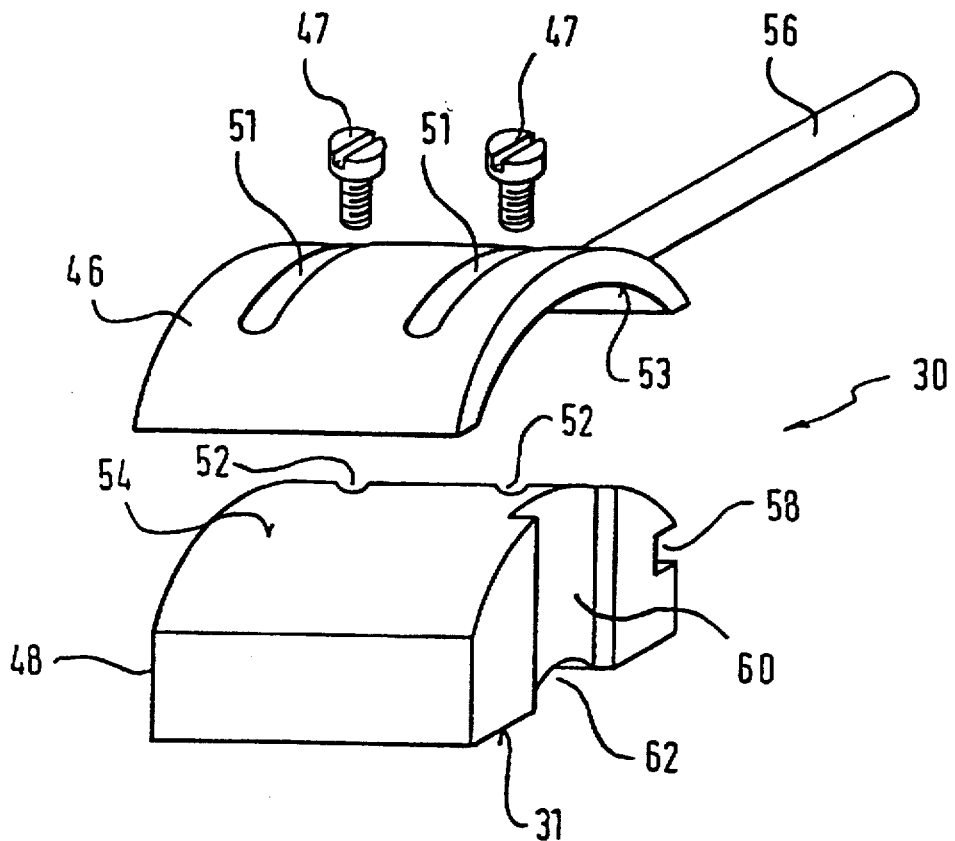
FIG. 4 shows an embodiment of a profiled jaw depicted as an exploded diagram.

FIG. 4 shows the layout of an embodiment of a profiled jaw for use on heating iron. The profiled jaw 30 consists of two members, an upper member 46 and a lower member 48, which can be securely connected together in a suitable manner, for example by using screws 47. The upper member and the lower member preferably comprise a material which conducts heat well and which at the same time can be easily machined, such as aluminum or bronze.

The face 53 of the upper member 46 has a concavely formed curvature designed to correspond to the 35 convex curvature of the face 54 of the lower member 48. Slots 51, through which the attachment screws 47 are fitted, are formed in the upper member 46; these attachment screws 47 can be screwed into the threads 52. As a result, the profiled jaw 30 composed of the upper member 46 and the lower member 47 can be adjusted, in terms of its inclination, relative to the attachment rod 56 which in turn is suitably connected to the shank 34 of the profiled jaw 30.

The lower member 48 may have a notch 58 into which a temperature sensor can be inserted. The lower member 48 also has a recess 60 which is disposed in the region of groove 62 for inserting the shrinkable tube and serves to increase the distance of the heated upper member 48 from the exposed artificial or genuine hair. This is intended to avoid damaging the artificial or genuine hair.

Figure 4A:
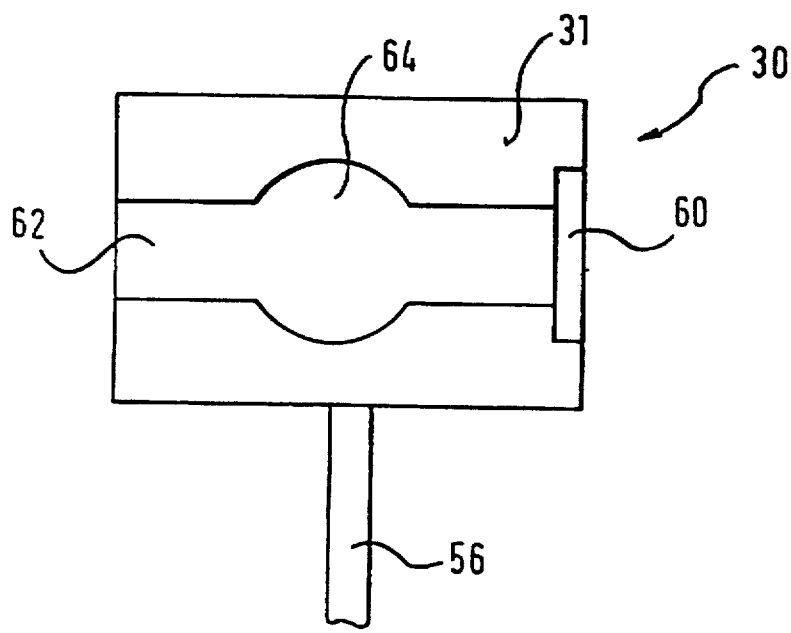
FIG. 4A shows a horizontal projection of the heating surface of the profiled jaw according to FIG. 4.

FIG. 4A shows a horizontal projection of the heating surface 31 of the profiled jaw 30 according to FIG. 4. An indentation 64 which serves to receive the thickened portion of the shrinkable tube in the region of the knot 17 is depicted in addition to the groove 62.

Figure 5:
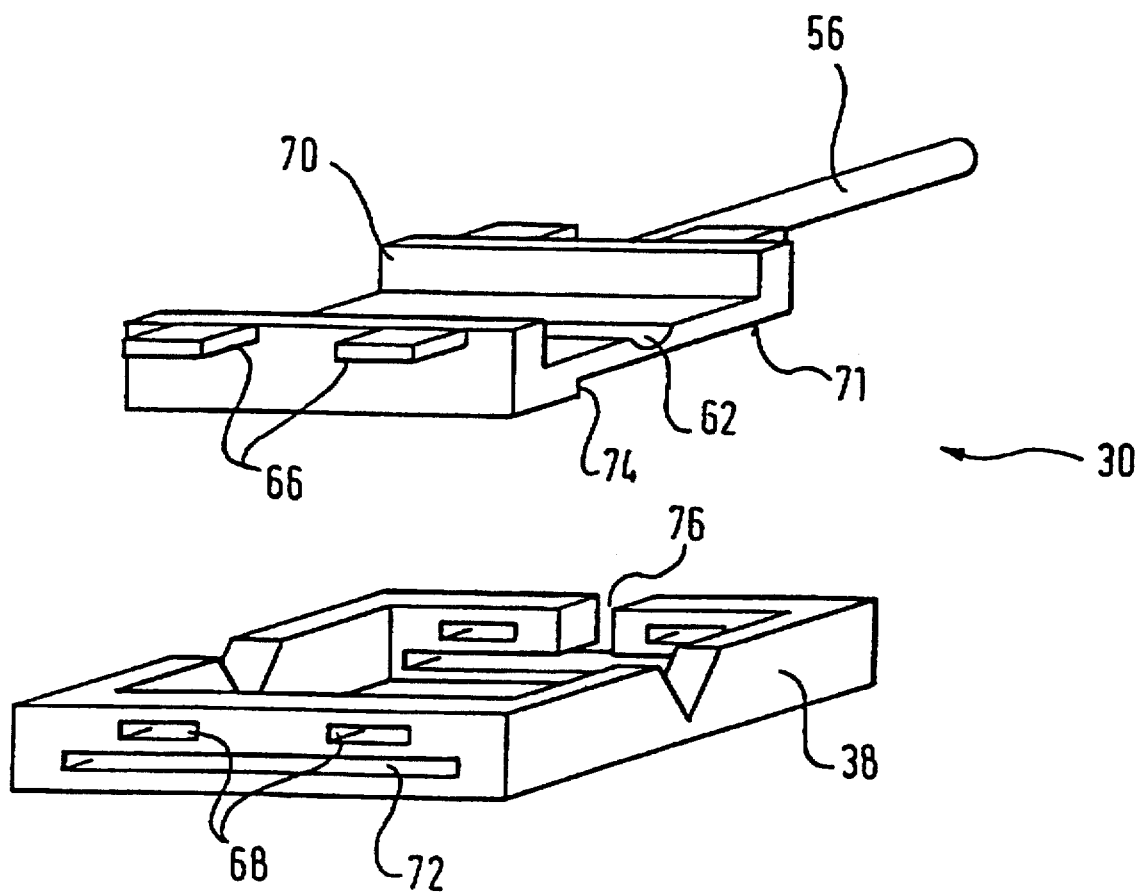
FIG. 5 shows another embodiment of a profiled jaw depicted as an exploded diagram.

FIG. 5 shows another embodiment of a profiled jaw of ruse on heating irons 20 according to the present invention.

The profiled jaw 30 consists of a trough 70 produced from a material that conducts well, particularly aluminum or bronze. As already explained by means of the profiled jaw shown in FIG. 4 and FIG. 4a, the trough 70 has an attachment rod 56 and a groove 62 for inserting the shrinkable tube 12. In the same way, as described on the basis of FIG. 4, the trough 70 may possess recesses (not depicted) for receiving that portion of shrinkage tube which is thickened in the region of the knot 17, as well as on one or both sides for increasing the distance of the heated trough from the exposed artificial or genuine hair.

A plurality of lugs 66 which serve to connect the trough 70 to the heat insulation element 38 are disposed on the trough 70. The heat insulation element 38 is attached to the trough 70 in that the lugs 66 pass through corresponding apertures 68 within the heat insulation element.

In the embodiment illustrated, it is possible to assemble the two members 70 and 38 since the heat insulation element is preferably produced from a plastic that insulates heat well, such as Teflon, and which is sufficiently elastic to be elongated to such an extend that the lugs 66 can be inserted into the apertures 68 on both sides.

The heat insulation element 38 is preferably shaped such that there exists an air gap between the upper surface 71 of the trough 70 and that surface of the heat insulation element 38 which covers same. A free convection flow of air may occur within this air gap, with the convection slots 72 serving to remove heat systematically. This causes the temperature to drop by about 30 Kelvin across the thickness of the air gap.

A step 74 which serves to receive a temperature sensor is also disposed in the surface 71 of the trough 70. The recess 76 within the heat insulation element 38 serves to receive the attachment rod 56.

While heating iron 20 is feasible, the two profiled jaws of which are formed according to the embodiment depicted in FIG. 4 or according to the embodiment depicted in FIG. 5, an advantageous embodiment is to have that profiled jaw of the heating iron which faces toward the scalp designed according to the embodiment in FIG. 5 and to have the other profiled jaw designed according to FIG. 4.

The method according to the invention for lengthening a person's own hair with artificial and/or genuine hair and for permanently fastening artificial and/or genuine hair is constituted by the following steps.

The extension strand of artificial and/or genuine hair is pretreated in an upstream step in that the hairs of that end of the extension strand to be inserted into the shrinkable tube are joined using a thermally stable adhesive. A rapid thermosetting adhesive can be used here, for example a cyanoacrylate-based adhesive. The extension strand pretreated by using an adhesive is advantageously twisted helically within the region of the affixed end.

A strand of a person's own hair consisting of ten to fifty hairs is then combined, and the strand of a person's own hair is knotted such that the knot is very close to the scalp, preferably about 5 mm therefrom. A preferred manner of forming this knot is to entwine the strand of hair using a crochet needle.

A shrinkable tube is then slid onto the knot of the strand of a person's own hair such that the knot of the strand of a person's own hair ends up being located roughly in the middle of the shrinkable tube in relation to its axial length.

The strand of artificial and/or genuine hair pretreated in the aforementioned manner is then slid into the tube so that as far as possible, this strand fills the entire axial length of the shrinkable tube. Finally, the shrinkable tube is shrunk by applying energy and the mechanically secure connection is produced. Alternatively, the shrinkable fastening element, which is preferably tubular in shape, may also exhibit a different geometry provided that an equally stable mechanical attachment can thereby be produced.

The advantage of the method according to the invention is that no adhesive is used and an easily securable and detachable connection between a strand of a person's own hair and an extension strand can be produced; moreover, this connection does not cause any damage to the person's own hair and can be re-used several times.

The method is used both for lengthening and thickening a person's own hair as well as for fastening hair-pieces.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

I claim:

1. A method of lengthening natural hair by using an extension strand comprising artificial hair or genuine hair and of permanently fastening said extension strand, the method comprising:

knotting a strand of natural hair to provide a knot in said strand;

sliding a fastening element, which can be shrunk when energy is applied, around said knot in said strand of natural hair;

sliding said extension strand of artificial or genuine hair into said fastening element; and shrinking said fastening element by applying energy in an amount effective for shrinking said element.

2. A method of lengthening natural hair according to claim 1, wherein the method further comprises joining the hairs of said extension strand using a thermally stable adhesive prior to shrinking said fastening element.

3. A method of lengthening natural hair according to claim 2, wherein the method further comprises twisting helically said extension strand in the region of the adhesive.

* * * * *